United States Patent
Kouthoofd

Patent Number: 5,808,815
Date of Patent: Sep. 15, 1998

[54] LENS SYSTEM

[75] Inventor: Barbara J. Kouthoofd, Rochester, N.Y.

[73] Assignee: Eastman Kodak Company, Rochester, N.Y.

[21] Appl. No.: 577,022

[22] Filed: Dec. 22, 1995

[51] Int. Cl.[6] .................................................. G02B 9/34
[52] U.S. Cl. .............................................................. 359/772
[58] Field of Search .................................. 359/772, 773, 359/774, 775, 765, 766

[56] References Cited

U.S. PATENT DOCUMENTS

| | | | |
|---|---|---|---|
| 1,540,752 | 6/1925 | Bielicke | 359/774 |
| 3,011,401 | 12/1961 | Sandback | 359/774 |
| 3,020,804 | 2/1962 | Cox et al. | 359/774 |
| 3,074,316 | 1/1963 | Cox et al. | 359/774 |
| 3,944,339 | 3/1976 | Momiyama | 359/774 |
| 4,384,766 | 5/1983 | Tokuhara | 359/732 |
| 4,441,792 | 4/1984 | Tateoka | 359/774 |
| 4,634,235 | 1/1987 | Fujioka | 359/773 |
| 5,161,060 | 11/1992 | Watz | 359/765 |

FOREIGN PATENT DOCUMENTS

| | | | |
|---|---|---|---|
| 63-116112 | 5/1988 | Japan | 359/766 |

*Primary Examiner*—Scott J. Sugarman
*Attorney, Agent, or Firm*—Svetlana Z. Short

[57] ABSTRACT

A lens system comprises, in order from a first side to a second side four lens elements. They are: a first, positive power lens element having its convex surface oriented towards the first side; a second, negative power lens element; a third, meniscus lens element having its concave surface oriented towards the first side; and a fourth, meniscus lens element having its concave surface oriented towards the second side.

21 Claims, 2 Drawing Sheets

LENS SYSTEM

CROSS-REFERENCE TO RELATED APPLICATIONS

This application is related to U.S. Ser. No. 08/577,207, now abandoned, entitled A CLUSTER LENS SYSTEM SUCH AS FOR USE IN PHOTOGRAPHIC PRINTERS, in the names of Barbara J. Kouthoofd and Lee R. Estelle; U.S. Ser. No. 08/577,028, now abandoned, entitled OBJECTIVE LENS SYSTEM, in the name of Barbara J. Kouthoofd; and U.S. Ser. No. 08/580,092, now U.S. Pat. No. 5,650,878 entitled A COMPACT LENS SYSTEM AND A METHOD FOR MAKING SUCH, in the name of Lee R. Estelle, all filed Dec. 22, 1995.

BACKGROUND OF THE INVENTION

1. Field of the Invention

This invention relates to compact, easily manufacturable lens systems comprising a small number of lens elements.

2. Description of the Prior Art

Optical designers are often required to design lens systems which not only provide a good image quality, but that are also compact, have very few lens elements, and are easy and relatively inexpensive to manufacture. One of the well known lens systems that can be easily manufacturable and that can provide good image quality with relatively few lens elements is a Cooke triplet.

Cooke triplets, defined as triplets consisting of a positive front lens element, a negative center lens element and a positive rear lens element are well known in the art of lens design and are used in many applications. In such triplets, the powers of the two positive lens elements are roughly equal, and the center lens element contains all of the lens system's negative power.

More specifically, in a typical Cooke triplet, the power of the rear lens element is within about 30% of the front lens element's power. The negative lens element has power that roughly equal to the power of one of the positive lens elements. The net power of the lens system is positive. Thus, the powers of the negative lens element and one of the positive lens elements roughly cancel each other out. The negative lens element is used to correct color and is also needed to compensate for the aberrations introduced by the strong positive lens elements.

A typical Cooke triplet utilizes air spaces to control Petzval curvature. Because of this, the lens system needs to have relatively large air spaces between lens elements. This requirement increases the total length of the lens system (measured from the front to the rear vertex). The lengthening of the lens, in turn, tends to increase clear aperture diameters of the lens elements. Thus it becomes difficult to design a truly compact "Cooke" style lens system.

Sometimes the optical power that the rear lens element is required to have is very strong and as a consequence the radii of curvatures of that element become too steep. In order to help correct aberrations, lens designers split the power of the strong rear lens element thus creating two weaker lens elements. The resultant lens systems are called triplet derivatives. Examples of such lens systems are provided in U.S. Pat. Nos. 1,540,752; 3,074,316; 3,011,401; and 3,020,804. These lens systems offer all of the advantages of a typical Cooke triplet, but in addition have better aberration control because they have two extra surfaces that can be used to correct aberrations. However, these lenses also have the drawbacks associated with typical Cooke triplets.

For example, U.S. Pat. No. 3,020,804 discloses an optical objective which has a typical Cooke triplet derivative configuration. The disclosed lens system comprises a front biconvex lens element, a relatively strong power biconcave lens element and two positive power meniscus lens elements. The focal length of the front most lens element is 0.6829, the focal length of the front negative lens element is −0.5058 and the combined focal length of the third and fourth lens elements is 0.9827. The total focal length of the lens system is 1.376. The absolute powers of the frontmost positive lens element and the second negative lens element are roughly equal to each other. The ratio of the powers of the front positive lens element to the negative lens element is −0.74. The combined focal length of the two rear lens elements roughly equals to the total focal length of the lens system. The ratio of powers of the two rear positive power lens elements to the front positive lens element is 0.695. As a consequence, the disclosed lens system is relatively long with the front vertex to rear vertex distance being 37% of its focal length. In addition the disclosed lens system also has relatively large clear aperture diameters.

SUMMARY OF THE INVENTION

An object of the present invention is to produce an improved lens system that has relatively few lens elements and good aberration correction.

A lens system according to the present invention comprises, in order from a first side to a second side four lens elements. They are: a first, positive power lens element having its convex surface oriented towards the first side; a second, negative power lens element; a third, meniscus lens element having its concave surface oriented towards the first side; and a fourth, meniscus lens element having its concave surface oriented towards the second side. According to one aspect of the present invention, the combined optical power of the third and fourth lens elements is negative.

According to another aspect of the present invention, the third and the fourth lens elements are identical.

According to yet another aspect of the present invention, the combined optical power of the third and fourth lens elements is less than one fifth of the power of the first, positive power lens element.

One advantage of the present invention is that it is very compact. Another advantage of the present invention is that it can be manufactured at a relatively low cost.

DESCRIPTION OF THE PREFERRED EMBODIMENT

Description of the Lenses

Figure 1:
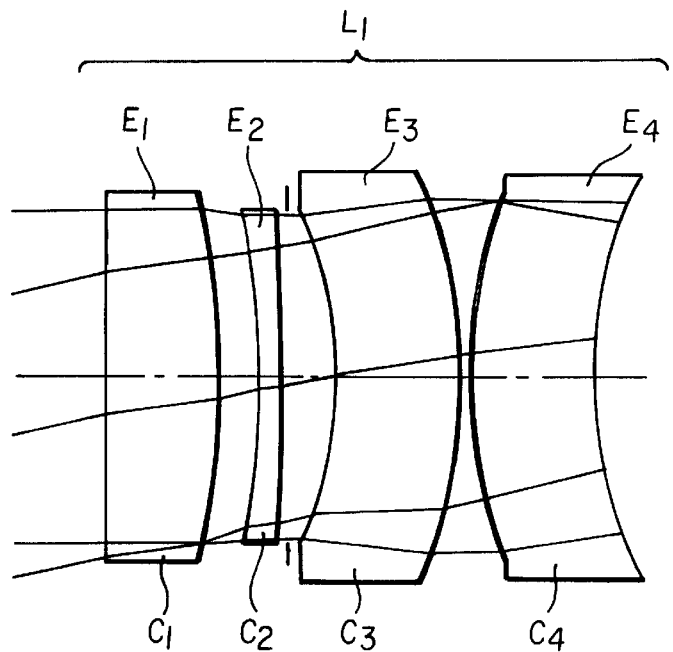
FIG. 1 shows the side view outline of a lens system $L_1$ according to the prefered embodiment of the present invention.

A lens system L1 is illustrated in FIG. 1 and is described below. The lens system works at finite conjugates and provides 2× magnification. Its parameters are provided in Table 1. Its aberrations are provided in FIGS. 2A–2I. This lens system is particularly well suited for use in a printer apparatus. Such printer apparatus is described in U.S. Ser. No. 08/577,027, now abandoned, entitled A CLUSTER LENS SYSTEM SUCH AS FOR USE IN PHOTO- GRAPHIC PRINTERS, in the names of Barbara J. Kouthoofd and Lee R. Estelle, which is incorporated by reference herein.

The lens system $L_1$ includes four lens elements $E_1$–$E_4$ sequentially arranged from the long conjugate side to the short conjugate side. The frontmost lens element $E_1$ is a biconvex lens element. The second lens element $E_2$ is a negative meniscus lens element with its concave surface oriented towards the long conjugate side. A diaphragm is located behind this lens element and in front of lens element $E_3$. The third lens element $E_3$ is a meniscus lens element with its concave surface towards long conjugate side. The fourth lens element $E_4$ is a meniscus lens element with its concave surface towards the short conjugate side. The front most positive power lens element $E_1$ introduces an inward curving field, under-corrected spherical aberration and positive distortion into the lens system. The second, negative power lens element $E_2$ corrects the under corrected spherical aberration introduced by the positive element $E_1$ and also corrects coma and some of the Petzval curvature. Lens elements $E_3$ and $E_4$ correct distortion introduced by the front lens element $E_1$. They also correct astigmatism and Petzval curvature.

In order to make this lens system less expensive, the third and the fourth lens elements $E_3$ and $E_4$ were designed to be identical. They have the same radii of curvature, same thickness and are made from the same material. They are simply oriented differently. However, these two lens elements do not have to be identical.

According to one aspect of the present invention, the combined optical power of the third and fourth lens elements is negative. It is preferred that both lens elements $E_1$ and $E_2$ be negative in order to be able to divide negative power between these two lens elements and to avoid steep radii. The lens system does not need to utilize air spaces to correct Petzval curvature as is done in Cooke triplets and Cooke triplet derivative lens systems. Instead, the two negative lens elements $E_3$ and $E_4$ are used to correct Petzval curvature, thus enabling a remarkably shortened lens system. In the lens system of the present embodiment, the front vertex to rear vertex distance equals 14% of the focal length.

However, it is contemplated that a similar lens system configuration having two rear lens elements of positive optical power will also work as long as these lens elements are relatively weak. As elements $E_3$ and $E_4$ become less negative, the power of the second lens element $E_2$ becomes more negative and the lens system tends to become larger. Thus, according to another aspect of the present invention the combined optical power of the third and fourth lens elements should be less than one fifth (0.2) of the optical power of the first, positive power lens element. It is preferred that the ratio be less than 0.15. It is even more preferable if this ratio is less than 0.1.

A method of designing a compact lens system, such as the lens system $L_1$, is described in U.S. Ser. No. 08/580,092, now U.S. Pat. No. 5,650,878, entitled A COMPACT LENS SYSTEM AND A METHOD FOR MAKING SUCH, in the name of Lee R. Estelle, which is incorporated by reference herein.

Lens system $L_1$ has an effective focal length of 129 mm, maximum F-number with no vignetting of F/10.5 and covers a full-field angle of about 26 degrees. The front vertex to rear vertex length of lens system $L_1$ is about 18 mm, the object distance is 374 mm and the image distance is 184 mm. Lens $L_1$ provides ½× demagnification (i.e. the object size is about twice as large as the image size). If used in a printer this lens will provide a 2× magnification when it is turned around— i.e., when the paper is located on its long conjugate side and when the film is located on its short conjugate side.

As stated above, the aberrations of lenses $L_1$ are provided in FIGS. 2A–2I.

Figures 2A, 2B, 2C:
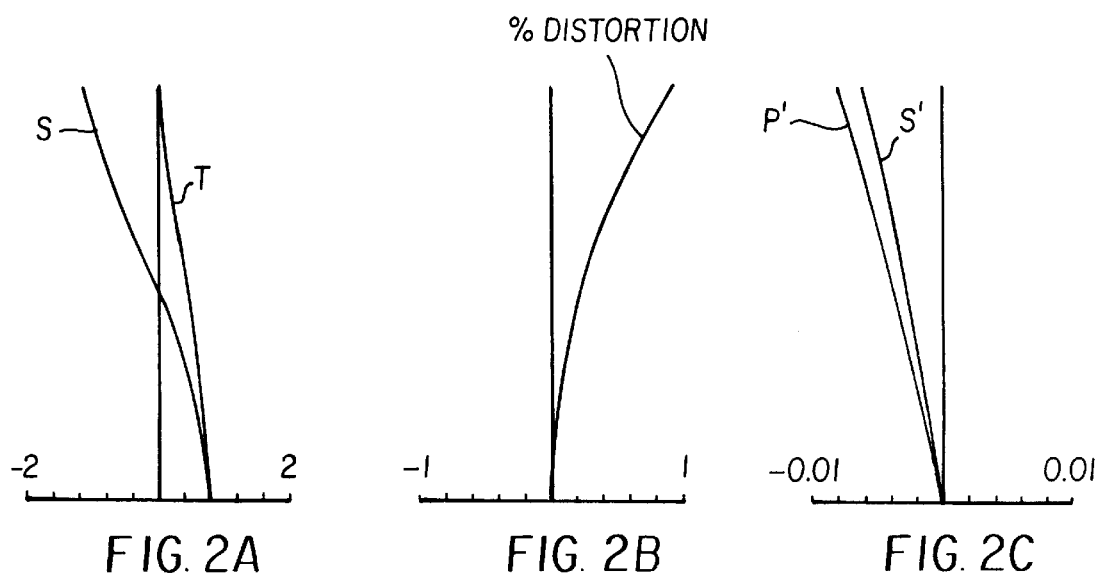
FIGS. 2A–2I provide aberration curves for the lens system $L_1$ illustrated in FIG. 1.
Figures 2D, 2E:
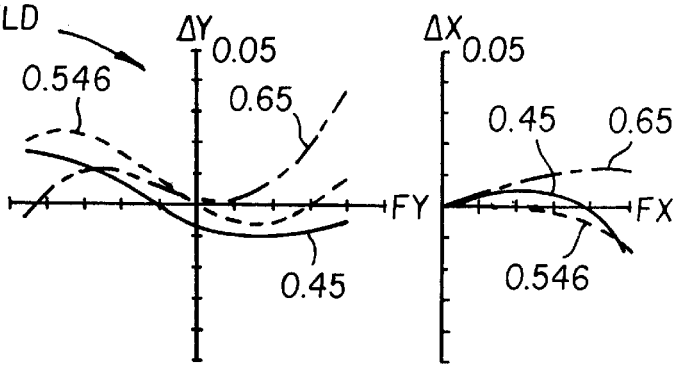
Figures 2F, 2G:
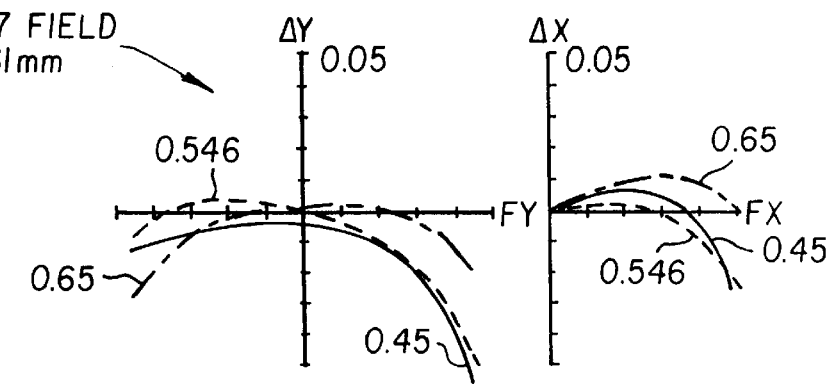
Figures 2H, 2I:
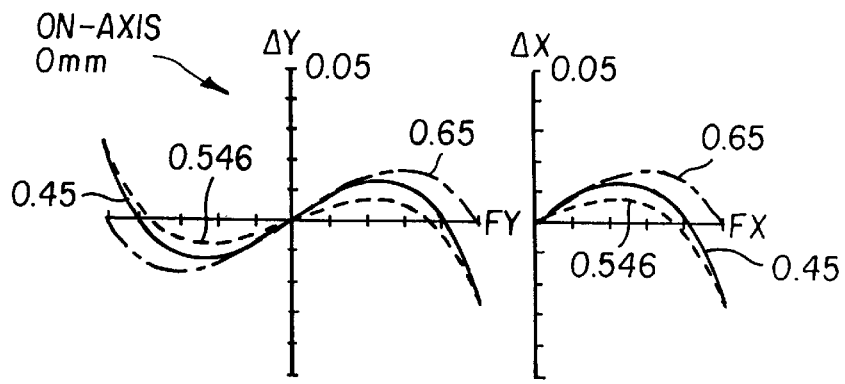

The astigmatism curves with respect to the field height in the sagittal direction S and in the tangential direction T in the focal plane (i.e., the plane of the negative) of the lens system $L_1$ are shown in FIG. 2A. The percent distortion in the same plane is shown in FIG. 2B. Lateral color aberration curves in increments of 0.002 mm for the P' (blue minus red) and for the S' (blue minus green) chromatic characteristics are shown in FIG. 2C. In these curves, blue is 450 nm, green is 546 nm, and red is 650 nm. The rim-ray curves at maximum field coverage, 0.7 of the field and on axis are shown in the family of curves of FIG. 2D through 2I. FY is a relative aperture in a Y direction and FX is a relative aperture in an X direction, they correspond to ray high increments $\Delta Y$ and $\Delta X$, respectively.

TABLE 1

| Surface | Clear Aperture | Radius | Thickness | Index | V-Number | Special Notes |
|---|---|---|---|---|---|---|
| 1 | 13.80 | 346.194 | 4.163 | 1.691 | 54.7 | LAK9 |
| 2 | 13.16 | −34.7582 | 1.500 | | | |
| 3 | 12.29 | −35.1825 | 1.000 | 1.755 | 27.6 | SF4 |
| 4 | 12.18 | −91.8203 | 0.100 | | | |
| | 12.10 | DIAPHRAGM | 1.678 | | | |
| 5 | 12.05 | −17.7845 | 4.657 | 1.683 | 44.7 | OHARA BAH51 |
| 6 | 13.52 | −20.0010 | 0.599 | | | |
| 7 | 13.78 | 20.0010 | 4.657 | 1.683 | 44.7 | OHARA BAH51 |
| 8 | 13.35 | 17.7845 | | | | |
| LENS LENGTH | | 18.354 | PTZ SUM (F/100) = 0.000411 | | | |

| Image Height | Angular Field | Approx. Rel. Illum. (Image) | Max. Aper. With No Vignetting |
|---|---|---|---|
| 15.91 | 4.56 | 0.98 | F/ 10.5 |
| 32.13 | 9.11 | 0.88 | F/ 11.4 |
| 46.11 | 12.90 | 0.77 | F/ 12.3 |

| Pupil | Location | Diameter |
|---|---|---|
| Ent. | 4.76 | 12.60 |
| Exit | −7.13 | 12.03 |

It should be noted that while the lens embodiments provided herein do not have aspheric surfaces, it is to be understood that other embodiments of this invention may have one or more aspheric surfaces.

The invention has been described in detail with particular reference to a preferred embodiment thereof, but it will be understood that variations and modifications can be effected within the spirit and scope of the invention.

What is claimed is:

1. A lens system comprising in order from a first side to a second side:

(a) a first, positive power lens component having its convex surface oriented towards the second side;

(b) a second, negative power lens component;

(c) a third, meniscus lens component having an optical power and a concave surface oriented towards the first side; and (d) a fourth, meniscus lens component having an optical power and a concave surface oriented towards the second side, the lens system characterized in that combined optical power of said third and fourth lens components is negative, and wherein there are no positive power lens components located between said second negative power lens component and said third meniscus lens component and between said third and said fourth meniscus lens components.

2. A lens system according to claim 1 wherein said first lens component is biconvex.

3. A lens system according to claim 1 wherein said second lens component is a meniscus lens component.

4. A lens system according to claim 1 wherein said first lens component is biconvex and said second lens component is a meniscus lens component.

5. A lens system comprising in order from a first side to a second side:
 (a) a first, positive power lens component having its convex surface oriented towards the second side:
 (b) a second, negative power lens component;
 (c) a third, meniscus lens component having an optical power and a concave surface oriented towards the first side; and
 (d) a fourth, meniscus lens component having an optical power and a concave surface oriented towards the second side, the lens system characterized in that (i) combined optical power of said third and fourth lens components is negative and (ii) said third and said fourth lens components are identical.

6. A lens system according to claim 5 wherein said third and said fourth meniscus lens components have negative optical power, respectively.

7. A lens system comprising in order from a first side to a second side:
 (a) a first, positive power lens component having its convex surface oriented towards the second side;
 (b) a second, negative power lens component;
 (c) a third, meniscus lens component having an optical power and a concave surface oriented towards the first side; and
 (d) a fourth, meniscus lens component having an optical power and a concave surface oriented towards the second side, the lens system characterized in that combined optical power of said third and fourth lens components is negative, and wherein said third and said fourth lens components are identical.

8. A lens system comprising in order from its long conjugate side to its short conjugate side:
 (a) a first, positive power lens component having its convex surface oriented towards the short conjugate side;
 (b) a second, negative power lens component;
 (c) a third, meniscus lens component having an optical power and a concave surface oriented towards the long conjugate side; and
 (d) a fourth, meniscus lens component having an optical power and a concave surface oriented towards the short conjugate side, the lens system characterized in that the absolute value of the combined optical power of said third and fourth lens components is less than one fifth of the power of said first, positive power lens component.

9. A lens system according to claim 8 wherein said combined optical power of said third and fourth lens components is less than 15% of the power of said first, positive power lens component.

10. A lens system according to claim 9 wherein said third and said fourth, lens components have negative optical power, respectively.

11. A lens system according to claim 10 wherein said third and said fourth lens components are identical.

12. A lens system according to claim 8 wherein said combined optical power of said third and fourth lens components is about one tenth or less than the power of said first, positive power lens component.

13. A lens system according to claim 8 wherein said third and said fourth lens components have negative optical power, respectively.

14. A lens system according to claim 13 wherein said third and said fourth lens components are identical.

15. A lens system according to claim 8 wherein said first lens component is biconvex and said second lens component is a meniscus lens component.

16. A lens claim according to claim 8 wherein said third and said fourth lens components are identical.

17. A lens system according to claim 16 wherein said first lens component is biconvex and said second lens component is a meniscus lens component.

18. A lens system consists in order from a first side to a second side:
 (a) a first, positive power lens element having its convex surface oriented towards the second side;
 (b) a second, negative power lens element;
 (c) a third, meniscus lens element having an optical power and a concave surface oriented towards the first side; and
 (d) a fourth, meniscus lens element having an optical power and a concave surface oriented towards the second side, the lens system characterized in that combined optical power of said third and fourth lens elements is negative.

19. A lens system according to claim 18 wherein said third and said fourth meniscus lens elements have negative optical power respectively.

20. A lens system consists in order from its long conjugate side to its short conjugate side:
 (a) a first, positive power lens element having its convex surface oriented towards the short conjugate side;
 (b) a second, negative power lens element;
 (c) a third, meniscus lens element having an optical power and a concave surface oriented towards the long conjugate side; and
 (d) a fourth, meniscus lens element having an optical power and a concave surface oriented towards the short conjugate side, the lens system characterized in that combined optical power of said third and fourth lens elements is less than one fifth of the power of said first, positive power lens element.

21. A lens system according to claim 20 wherein said third and said fourth meniscus lens elements have negative optical power respectively.

* * * * *